Patented Aug. 31, 1948

2,448,255

UNITED STATES PATENT OFFICE 2,448,255

CATALYSTS FOR USE IN THE PRODUCTION OF CHLORINE

Aldo De Benedictis and Daniel B. Luten, Jr., Berkeley, Calif., assignors to Shell Development Company, San Francisco, Calif., a corporation of Delaware No Drawing. Application December 7, 1943, Serial No. 513,323

4 Claims. (Cl. 23—97)

The present invention relates to novel, active, and efficient catalysts particularly suitable for use in the manufacture of free chlorine by the oxidation of hydrogen chloride. It relates also to a catalyst composition for use in the manufacture of free chlorine by the oxidation of hydrogen chloride via the Deacon process, which catalyst is especially active because of the inclusion of a promoter comprising lead dichloride. The invention relates further to a novel Deacon process catalyst which is of sufficiently low melting point to be in the liquid state at the temperatures at which the Deacon process is customarily operated, i. e., at temperatures of between about 275° C. and about 375° C. The invention relates particularly to a catalyst for the Deacon process, which catalyst is superior to the known catalysts because of the incorporation of a promoter (lead dichloride) which greatly enhances its activity and because of the inclusion of melting point depressants which result in the formation of a catalyst which is liquid at the temperature of operation of the Deacon process and which may therefore be used and regenerated with particular effectiveness.

The Deacon process has been known for many years. It affords a commercial method for the manufacture of free chlorine via the oxidation of hydrogen chloride by means of the reaction represented by the basic equation:

$$4HCl + O_2 \rightleftarrows 2Cl_2 + 2H_2O$$

This reaction has been customarily carried out in the presence of a catalyst composition comprising the chlorides of metals having variable valences, e. g., the chlorides of copper and of iron. These have been used as such, in combination with various promoting substances, and in combination with or disposed upon carriers such as asbestos, pumice, clay or alumina. Such catalysts have been termed "Deacon process catalysts." When the higher chlorides of these metals of variable valence are heated in the presence of hydrogen chloride and oxygen or an oxygen-containing gas such as air, the metal chloride liberates free chlorine and is at the same time reduced itself to a metal chloride in which the metal is in a lower valence state. The reduced metal chloride may then be reconverted to the oxidized or higher valent form by reacting it with hydrogen chloride and oxygen. When copper chloride is used, these reactions may be represented by the equations:

$$4CuCl_2 \xrightarrow{heat} 2Cu_2Cl_2 + 2Cl_2$$

and $$2Cu_2Cl_2 + 4HCl + O_2 \longrightarrow 4CuCl_2 + 2H_2O$$

The process may be carried out in a single stage wherein the metal chloride, hydrogen chloride and oxygen are caused to react continuously in a single reaction chamber, or it may be carried out in a two-stage process in which a metal chloride of higher valence is heated in one chamber to form free chlorine and a metal chloride of lower valence. The latter is then reconverted to the higher chloride by reaction with hydrogen chloride and oxygen in a separate stage.

Despite the fact that the Deacon process has been known for many years and has been the subject of extensive experimental investigation and modification throughout the entire period of its development and application, certain inherent defects have made the process relatively inefficient and have seriously interfered with its commercial success. One of the chief sources of difficulty has been the fact that the catalysts used have not been satisfactory. Many of the catalysts which have been developed are not sufficiently active to enable satisfactorily high yields and conversions to be obtained. Catalysts which are more active are prone to cause the development of a "hot spot" in the reaction chamber, i. e., a zone in which the temperature is unduly high by reason of the fact that the reaction takes place within a relatively small area. Since the reaction is exothermic, the evolved heat causes an excessive temperature rise within the comparatively small area in which the reaction takes place. This is undesirable since it causes undesirable side reactions and tends to result in the decomposition of the catalyst so that the catalyst life is materially shortened. Since the reaction is an exothermic equilibrium reaction, operating under excessively high temperatures also has the effect of adversely affecting the equilibrium and thus materially decreasing the yield of chlorine. Disposition of the catalyst on a carrier, such as asbestos, pumice, alumina or clay, has, in some instances, resulted in the formation of a superior catalyst, but still has not been entirely satisfactory. In addition to the problems of securing a catalyst of suitable activity, the use of a carrier has introduced new problems in that it has been difficult to dispose the catalyst on the surface of the support material with sufficient uniformity to result in the formation of a reliable catalyst of predictable properties. To overcome this difficulty, pelleting procedures have been resorted to wherein the carrier has been ground to a powder, mixed with a catalytically active material and the resulting mixture compressed into pellets of the desired form and size. Although this procedure is relatively successful in producing a catalyst of uniform composition and activity, it does not usually provide a catalyst of sufficient mechanical strength to withstand contact at elevated temperatures with the caustic reagents encountered in the Deacon process over sufficiently long periods of use. When contacted with such reagents as chlorine, hydrogen chloride and oxygen at elevated temperatures, the pelleted catalysts tend to disintegrate and lose their usefulness after relatively short periods of operation.

In spite of the difficulties which attend its operation, the Deacon process for the production of chlorine has remained of economic importance for several reasons. In the first place, although the electrolytic process for the commercial preparation of chlorine from brine has been preferentially used for many years, its use has been attended by the disadvantage that caustic soda or caustic potash are unavoidable by-products. Where there is little or no commercial demand for these by-products, the electrolytic process cannot be operated advantageously and the Deacon process becomes of commercial interest. In the second place, it has recently become of increasing importance to find an outlet for by-product hydrogen chloride obtained from commercial processes for the chlorination of hydrocarbon substances, particularly such as are obtained by the fractionation processes of the petroleum industry. Catalytic oxidation of this by-product hydrogen chloride to free chlorine via the Deacon process or a modification thereof would provide such an outlet. Thirdly, processes have been developed for the chlorination of olefins to form the corresponding olefin dichlorides which are useful as solvents and as intermediates in the synthesis of other valuable organic chemicals. These chlorination processes have been modified so as to make use of hydrogen chloride rather than chlorine as a raw material. This has been accomplished by treating an olefin with a mixture of hydrogen chloride and air or oxygen in the presence of a metal chloride catalyst, thereby effecting the conversion of the olefin to the corresponding olefin dichloride in a single step. It has also been effected in a two stage process whereby the olefin is contacted with a metal chloride of higher valence to form the olefin dichloride and the metal chloride of lower valence, which is subsequently oxidized to the higher valence state by treatment with hydrogen chloride and oxygen in a separate stage. For these and other reasons it is of economic value to provide a superior catalyst for the Deacon process, i. e., an active catalyst of uniform composition which is relatively durable and has a relatively long life, and which is adaptable to use in either single stage or two stage operating procedures.

It has now been discovered that particularly satisfactory and desirable catalysts for use in the oxidation of hydrogen chloride to chlorine via the Deacon process, which catalysts are exceptionally active and retain their activity over long periods of use, comprise a catalytically active chloride of a metal of variable valence together with a promoter comprising lead dichloride ($PbCl_2$), which is also known as plumbous chloride. The lead dichloride may be used together with the chloride of the metal of variable valence as a mixture of the two solids, in admixture with a third substance, or as a constituent of fluid catalyst mixtures. It may be disposed on a carrier together with the chloride of the variable valent metal, or it may be used as a constituent of pelleted catalysts. The lead dichloride-containing catalysts may be used over the entire range of temperature, pressure, flow rates, and other operating conditions which are customarily used in the Deacon process. The activity of the lead dichloride as a promoter is not due to its physical state, to the presence of the other constituents of the catalyst mixture, or to the use of special operating conditions. It is, rather, an inherent and unique property of lead dichloride that it promotes or catalyzes the oxidation by a mixture of hydrogen chloride and oxygen of a lower valent metal chloride, such as cuprous chloride, to the corresponding chloride of higher valence, e. g., cupric chloride. Lead dichloride is therefore especially well suited for use as a promoter in Deacon process catalysts. Its effectiveness may be illustrated by the fact that cuprous chloride catalysts containing lead dichloride as a promoter may be oxidized almost completely (i. e., 99.6%) to cupric chloride by a relatively short treatment with hydrogen chloride and oxygen, while treatment under the same conditions of cuprous chloride catalysts, which do not contain lead dichloride, results in a conversion of but about 33% of the cuprous chloride to cupric chloride. Experimental evidence of this is given in the examples cited hereinbelow.

It has been further discovered that other unique and desirable properties of lead dichloride when used as a constituent of Deacon process catalysts reside in its melting point and solubility characteristics, which are such that lead dichloride may be mixed with a catalytically active chloride of a metal of variable valence and with another or other suitable salts to form a solid mixture which has a relatively low melting point and is fluid at the temperatures which are customarily encountered in the operation of the Deacon process. It is thus possible to prepare a catalyst which is especially active because of the presence of the lead dichloride, which is of uniform composition throughout and of reproducible activity because of its fluid nature, and which, as will be more fully described hereinbelow, is readily adaptable for use in almost any modification of the Deacon process regardless of whether it is carried out as a single stage process or as a two stage process.

The lead dichloride may be introduced into the catalyst composition either as such or in the form of compounds which may be readily converted to lead dichloride by suitable treatment. It may be introduced, for example, as lead tetrachloride ($PbCl_4$), which, when heated to a temperature of about 100° C., decomposes with the elimination of free chlorine to form the desired lead dichloride. It may also be introduced in the form of compounds such as lead carbonate ($PbCO_3$) or lead monoxide (PbO) which may be readily converted to lead dichloride by reacting them with hydrogen chloride or hydrochloric acid. Mixtures of lead dichloride and/or of compounds which may be readily converted to lead dichloride may also be used.

A preferred catalyst composition is represented by one comprising a catalytically active chloride of a metal of variable valence together with suitable quantities of a promoter comprising lead dichloride and a third constituent which acts as a mutual solvent and/or melting point depressant, which comprises a single salt or a mixture of salts whose melting point and solubility characteristics are such as to result in the formation of a mixture which melts at a relatively low temperature and which, when in the liquid state, consists of a single phase and is uniform throughout. Metals of variable valence, the chlorides of which are active as catalysts for the Deacon process and may be used as constituents of the presently disclosed catalyst compositions, are to be found principally in the first long period and in the left-hand subgroup of group VI of the periodic table. They include those metals of variable valence which form at least two chlorides having salt-like properties. Such metals are copper, iron, titanium, vanadium, chromium, manganese, cobalt, molybdenum and tungsten. Copper and iron are preferred members of this group, since their chlorides are particularly active as catalysts for the Deacon process and because they are readily available commercially. The chlorides of the listed metals may be used individually or in combination with other members of the group. When the higher chlorides of any of the metals listed are present as constituents of the catalyst, a composition is produced which, when heated to a suitable temperature, is capable of liberating free chlorine by reason of the decomposition of the higher chloride to a chloride of lower valence. The latter may then be converted again to the chloride of higher valence by treatment with hydrogen chloride and oxygen either in the same stage or in a separate regeneration step. The metal chloride, e. g. copper chloride, may be incorporated in the catalyst composition in the form of either the higher or lower chloride, as a mixture of the two salts, or in the form of compounds which may be readily converted under the conditions of operation to the desired chloride. The term "copper chloride" as used herein refers to and includes cupric chloride ($CuCl_2$), cuprous chloride ($Cu_2Cl_2$), or a mixture of the two salts.

In addition to the catalytically active chloride of a metal of variable valence and a promoter comprising lead dichloride, there must also be present in these low-melting catalyst compositions a third component which comprises a salt or a mixture of salts added primarily to serve as a mutual solvent and to depress the melting point of the resulting compositions by the optimum or desired amount. This compound must therefore be soluble in molten lead dichloride and in the molten salt of a metal of variable valence which is used so as to result in the formation of a ternary mixture having a melting point substantially below that at which the Deacon process is carried out. Salts which may be used for this purpose comprise those salts which are stable at the temperature of reaction, which will not react with the other constituents of the catalyst composition or with the gaseous feed entering the reaction chamber, and which have the necessary melting point and solubility characteristics. Stable, non-reactive salts which have a melting point of between about 400° C. and about 900° C. are in general satisfactory. The salts should not be salts of oxidizing acids or of weak acids, since these tend to react with the hydrogen chloride in the feed or to decompose upon heating. Specific examples of suitable salts which may be used as melting point depressants are sodium chloride, potassium chloride, lithium chloride, barium chloride, strontium chloride, magnesium chloride, zinc chloride, cadmium chloride, manganese chloride, iron chloride, cobalt chloride, and nickel chloride, sodium sulfate, potassium sulfate, lithium sulfate, magnesium sulfate, zinc sulfate, cadmium sulfate, manganese sulfate, iron sulfate, cobalt sulfate, sodium phosphate, lithium phosphate, barium phosphate, zinc phosphate, iron phosphate, cobalt phosphate, and nickel phosphate. Sodium chloride and potassium chloride are preferred members of this group. These compounds may be used singly or in combination with each other to produce the desired effect.

The amounts of the constituents used may be varied depending upon the nature of the particular substances used in compounding the catalyst composition. In general, these may vary within the following broad ranges: the salt of a metal of variable valence, e. g. cuprous chloride, 10–70%; lead dichloride, 10–40%; and the melting point depressant, 10–50%. It is preferred, however, to use between about 30% and about 50% of the salt of a metal of variable valence, between about 15% and about 25% of lead dichloride, and between about 25% and about 45% of the melting point depressant. It has been found particularly desirable to use a mixture of the chlorides of sodium and potassium as the third constituent of the catalyst compositions. These chlorides may best be used in a ratio of about 30 parts by weight of potassium chloride to about 10 parts by weight of sodium chloride. A preferred catalyst composition which has an especially suitable melting point, is particularly reactive, and is well suited to use under the conditions employed in the Deacon process, comprises about 40 mol % by weight cuprous chloride, about 30% potassium chloride, about 10% sodium chloride, and about 20% lead dichloride.

The catalyst compositions may be prepared by any method which insures thorough mixing of the constituents so as to result in the formation of uniform compositions. The constituents may, for example, be mixed as solids and then melted, preferably with stirring or other form of agitation. Or, if desired, they may be melted independently and the molten salts mixed together to form the finished compositions. The following examples illustrate the catalysts of the invention and demonstrate the promoting action of the lead dichloride in the oxidation of cuprous chloride to cupric chloride, i. e., in the second stage of the Deacon process.

*Example I*

A catalyst was prepared by mixing together 6.78 parts by weight of cuprous chloride, 3.82 parts potassium chloride, 1 part sodium chloride and 9.58 parts lead dichloride. This resulted in the formation of a composition containing about 40 mol percent of cuprous chloride, 30% potassium chloride, 10% sodium chloride and 20% lead chloride. The resulting mixture was heated until the constituents melted to form a clear solution having a melting point of 225° C. to 235° C.

To test the activity of this catalyst in the Deacon process a mixture of 4 volumes of oxygen to 1 volume of hydrogen chloride was passed through a quantity of the above catalyst in the molten state and contained in a suitable reaction chamber. The temperature was maintained at 300° C. and the exit gases were passed through a 5% sodium hydroxide solution to determine the amount of unreacted hydrogen chloride and the chlorine loss. After 4 hours, the salt mixture was analyzed for cuprous chloride by direct titration with potassium dichromate in acid solution, using sodium diphenylamine sulfonate as an indicator. This analysis showed that 99.74% of the cuprous chloride had been oxidized to cupric chloride. Analysis of the sodium hydroxide solution showed that 98% of the hydrogen chloride had reacted with the catalyst mixture. No free chlorine was detected in the exit gases.

Example II

A catalyst was prepared by melting together sufficient cuprous chloride, potassium chloride, sodium chloride, zinc chloride and lead dichloride to form a mixture containing approximately 5.07 parts by weight cuprous chloride, 3.82 parts by weight potassium chloride, 1 part by weight sodium chloride, 2.32 parts by weight zinc chloride and 9.58 parts by weight lead dichloride. A mixture containing approximately 4 volumes of oxygen to each volume of hydrogen chloride was passed through this molten salt mixture for 4 hours at 300° C. At the end of the operating period, analysis of the catalyst showed that 99.78% of the cuprous chloride had been oxidized to cupric chloride.

Example III

A catalyst was prepared by melting together sufficient cuprous chloride, potassium chloride, sodium chloride and zinc chloride to give a composition which contained 5.02 parts by weight cuprous chloride, 3.82 parts by weight potassium chloride, 1.00 part by weight sodium chloride and 6.97 parts by weight zinc chloride. The composition thus contained no lead dichloride. A gaseous mixture containing 4 volumes of oxygen for each volume of hydrogen chloride was passed through the molten salt mixture for a period of 6 hours. The temperature was maintained at 300° C. Analysis of the salt mixture at the end of this time indicated that only 33.6% of the cuprous chloride had been oxidized to cupric chloride.

Use of the liquid salt catalysts of the invention thus lends an efficiency and flexibility to the Deacon process which that process does not otherwise possess. As is demonstrated by the examples cited hereinabove, the incorporation of lead dichloride into the composition imparts thereto greater activity than is possessed by compositions which do not contain this ingredient. In addition, the unique physical properties, i. e., the melting point and solubility characteristics, of the lead dichloride are such as to make it possible by the addition of suitable salts as melting point depressants and/or mutual solvents to form a mixture having a sufficiently low melting point to be liquid at the temperature of operation, i. e. at temperatures of between about 275° C. and about 375° C. This makes it particularly easy to carry out the oxidation of hydrogen chloride to chlorine by means of the Deacon process. It is only necessary, for example, to contact a gaseous mixture comprising hydrogen chloride and oxygen with the catalyst by passing the said mixture through or over a quantity of molten catalyst contained in a heated reaction chamber. When the mixture of gases is passed through the molten catalyst better contact between the catalyst and the feed is obtained than is possible when the ordinary solid catalysts are used. Because it is used in a liquid state, the catalyst has uniform and reproducible catalytic properties. Loss of activity of the catalyst and its failure because of mechanical disintegration are likewise not problems as they are with the pelleted catalysts. When using the liquid catalysts of the invention, the oxidative process may be carried out in either one or two stages without the necessity of employing elaborate and expensive equipment. Thus, hydrogen chloride may be oxidized directly to free chlorine by contacting it with the liquid catalyst compositions in the presence of oxygen. This represents the single stage process wherein the chloride of the metal of variable valence is reduced from the higher chloride to the lower chloride with the elimination of free chlorine and is immediately reoxidized to the higher valence state by contact with the gaseous mixture comprising hydrogen chloride and oxygen. If desired, however, these steps may be separated and the reaction carried out in two stages. In the first stage a quantity of molten catalyst comprising, for example, cupric chloride, lead dichloride, sodium chloride and potassium chloride, is heated to drive off chlorine, and at the same time reduce the cupric chloride to cuprous chloride. The fluid catalyst may then be circulated to another chamber where it is regenerated by contacting it with hydrogen chloride and oxygen. The regenerated catalyst may then be recycled through the original chamber and caused to liberate an additional amount of chlorine. Use of a liquid catalyst thus makes possible a simple, continuous two-stage process for the oxidation of hydrogen chloride to free chlorine and eliminates one of the most troublesome features of the older processes using solid catalysts, in that by carrying out the reaction in two stages, the temperature may be better controlled and "hot spots" in the catalyst be avoided. This results in longer catalyst life, improved yields of chlorine, and improved over-all efficiency of operation.

The catalysts of the invention may also be applied to the conversion of olefins to olefin dichlorides by means of a modified Deacon process with the same desirable results. This likewise may be accomplished by either a single-stage or a two-stage process. In the former, the olefin is caused to react with hydrogen chloride and oxygen in the presence of the catalyst, thereby forming the olefin dichloride and water as products. In the two-stage process the olefin is first contacted with the quantity of catalyst which contains the metal chloride in its higher valence stage. This results in the formation of the olefin dichloride and the reduction of the higher chloride to a lower chloride. The latter is then reconverted to the higher chloride by treatment with hydrogen chloride and oxygen in a separate stage.

We claim as our invention:

1. A process for converting cuprous copper to cupric copper which comprises contacting hydrogen chloride in admixture with an oxygen-containing gas with a fluid melt initially consisting before said contacting of substantially 30 to 50 mol % cuprous chloride, 15 to 25 mol % lead dichloride, and 25 to 45 mol % alkali metal chloride while maintaining said melt fluid at a temperature of about 275° C. to about 375° C.

2. A process for converting cuprous copper to cupric copper which comprises contacting hydrogen chloride in admixture with an oxygen-containing gas with a fluid melt initially consisting before said contacting of substantially 30 to 50 mol % cuprous chloride, 15 to 25 mol % lead dichloride, and 25 to 45 mol % of at least one alkali metal chloride while maintaining said melt fluid at a temperature of about 275° C. to about 375° C.

3. A process for converting cuprous copper to cupric copper which comprises contacting hydrogen chloride in admixture with an oxygen-containing gas with a fluid melt initially consisting before said contacting of substantially 30 to 50 mol % cuprous chloride, 15 to 25 mol % lead dichloride, and 25 to 45 mol % of a mixture of sodium chloride and potassium chloride, said sodium chloride and potassium chloride being present in a mol ratio of 1:3, while maintaining said melt fluid at a temperature of about 275° C. to about 375° C.

4. A process for converting cuprous copper to cupric copper which comprises contacting hydrogen chloride in admixture with an oxygen-containing gas with a fluid melt initially consisting before said contacting of substantially 40 mol % cuprous chloride, 20 mol % lead dichloride, 10 mol % sodium chloride, and 30 mol % potassium chloride, while maintaining said melt fluid at a temperature of about 275° C. to about 375° C.

ALDO DE BENEDICTIS.
DANIEL B. LUTEN, Jr.

REFERENCES CITED

The following references are of record in the file of this patent:

UNITED STATES PATENTS

| Number | Name | Date |
| --- | --- | --- |
| 1,984,369 | Gensch | Apr. 18, 1934 |
| 2,075,889 | Dreyfus | Apr. 6, 1937 |
| 2,206,399 | Grosvenor et al. | July 2, 1940 |
| 2,280,673 | Thomas | Apr. 21, 1942 |
| 2,418,402 | Gorin | Apr. 1, 1947 |
| 2,418,930 | Gorin | Apr. 15, 1947 |